United States Patent
Fukami (10) Patent No.: US 11,487,649 B2
(45) Date of Patent: Nov. 1, 2022

(54) VERIFICATION DEVICE AND METHOD FOR VERIFYING A PROGRAM USING A TREE STRUCTURE OF COMMON AND NON-COMMON TEST SCENARIO PHASES

(71) Applicant: HITACHI ASTEMO, LTD., Hitachinaka (JP)

(72) Inventor: Yuji Fukami, Tokyo (JP)

(73) Assignee: Hitachi Astemo, Ltd., Ibaraki (JP)

(*) Notice: Subject to any disclaimer, the term of this patent is extended or adjusted under 35 U.S.C. 154(b) by 0 days.

(21) Appl. No.: 17/293,526

(22) PCT Filed: Jan. 30, 2020

(86) PCT No.: PCT/JP2020/003316
§ 371 (c)(1),
(2) Date: May 13, 2021

(87) PCT Pub. No.: WO2020/166345
PCT Pub. Date: Aug. 20, 2020

(65) Prior Publication Data
US 2021/0406160 A1    Dec. 30, 2021

(30) Foreign Application Priority Data

Feb. 15, 2019 (JP) .............................. JP2019-025538

(51) Int. Cl.
*G06F 11/36* (2006.01)
(52) U.S. Cl.
CPC ...... *G06F 11/3688* (2013.01); *G06F 11/3664* (2013.01)
(58) Field of Classification Search
CPC ........................................... G06F 11/36–3696
See application file for complete search history.

(56) References Cited

U.S. PATENT DOCUMENTS

| | | | |
|---|---|---|---|
| 8,533,544 B2* | 9/2013 | Tepus | G06F 11/3688 714/724 |
| 2012/0017128 A1* | 1/2012 | Tepus | G06F 11/3688 714/724 |

(Continued)

FOREIGN PATENT DOCUMENTS

| | | |
|---|---|---|
| JP | 2000-231495 A | 8/2000 |
| JP | 2007-018254 A | 1/2007 |

(Continued)

OTHER PUBLICATIONS

Japanese Office Action dated Mar. 1, 2022 for Japanese Patent Application No. 2020-572155.

(Continued)

*Primary Examiner* — Todd Aguilera
(74) *Attorney, Agent, or Firm* — Volpe Koenig (57) ABSTRACT

A system for accelerating testing of a software program includes a virtual computer and a test execution control computer. The virtual computer imitates a microcomputer equipped with a software program to be tested. The test execution control computer divides a plurality of test scenarios into common phases; to create and store a tree structure mapping out the plurality of test scenarios, the tree structure where the common phase is followed by a non-common phase, the common phase branched out into the non-common phases. The virtual computer executes the common phase in accordance with the tree structure, and stores as a snapshot a state of the virtual computer. The virtual computer to uses the snapshot to reproduce the state of the virtual computer that has executed the common and non-common phases, when the test execution control computer causes the virtual computer to execute a second test scenario.

6 Claims, 7 Drawing Sheets

(56) References Cited

U.S. PATENT DOCUMENTS

| | | | |
|---|---|---|---|
| 2018/0152341 A1 | 5/2018 | Maeda et al. | |
| 2021/0374215 A1* | 12/2021 | Nissen | G06F 21/105 |
| 2022/0012083 A1* | 1/2022 | Brooker | G06F 9/45558 |

FOREIGN PATENT DOCUMENTS

| | | |
|---|---|---|
| JP | 2013-120440 A | 6/2013 |
| JP | 2017-059210 A | 3/2017 |

OTHER PUBLICATIONS

Miyazaki, Yoshihiro, "Functional Safety ISO26262 and Virtual ECU Applied Technology, p. 10, Next Generation Software Verification Environment: V2Cloud," [online], Nov. 14, 2012, [searched on Jan. 11, 2019].

\* cited by examiner

VERIFICATION DEVICE AND METHOD FOR VERIFYING A PROGRAM USING A TREE STRUCTURE OF COMMON AND NON-COMMON TEST SCENARIO PHASES

TECHNICAL FIELD

The present invention relates to a technique for using a virtual computer to verify software, and particularly to a verification technique suitable for development of an incorporated system including a mechanism, hardware and the software.

BACKGROUND ART

Recently, control of an automobile vehicle has been more highly functional and more complicated, thereby increasing the number of electric control unit (ECU)s mounted to a single vehicle. The ECUs are provided in plurality and are coordinated with one another to control the single vehicle as a system. Here, the system for controlling the single vehicle is complicated. Thus, a software program, a part of which has been corrected, is prone to affect the system in a range where the designer has not intended, causing a fault. Accordingly, when the software program has been corrected, a wide ranging regression test is required such that quality of the system is assured.

Concurrently, knowledge and sensibilities or techniques for automobiles, such as electronic functional safety standards (ISO26262), Fault Tree Analysis (FTA), and Failure Mode and Effect Analysis (FMEA), are required such that a high level of safety and a high level of reliability are ensured in the automobiles. These requirements lead to improvement of the safety and the reliability of the automobiles, but on the other hand, lead to an increase in the range of the test.

NPL 1 proposes to test a software program of a system for controlling an automobile in a virtual verification environment that is based on cloud computing using a virtual model and a virtual simulator.

CITATION LIST

Non-Patent Literature

NPL 1: Yoshihiro Miyazaki, "Functional Safety ISO26262 and Virtual ECU Applied Technology, p 10, Next Generation Software Verification Environment: V2Cloud", [online], Nov. 14, 2012, [searched on Jan. 11, 2019], Internet <URL: http://www.edsfair.com/2012/special/pdf/eds2012_sp01_2.pdf>.

SUMMARY OF INVENTION

Technical Problem

With the virtual verification environment proposed in NPL 1, it is possible to test the software program for controlling the automobile under various conditions, and it is easier to execute the test automatically.

Further, automobiles are required to be developed in a shorter period of time. Thus, in development of the automobiles, a prototype-free approach, where each of the automobiles is developed without a prototype vehicle, is rapidly increasing. In the prototype-free approach for developing the automobiles, the software program is required to be tested in an environment without a vehicle, and tested efficiently in the shorter period of time. Concurrently, a high level of quality needs to be ensured.

However, when testing in the virtual verification environment, the model and the simulator are configured to virtually imitate each mechanical system and each electronic circuit of the vehicle. Here, speed of the test is reduced. Typically, the speed of the test in the virtual verification environment is reduced to 1/100 to 1/3000 of that of a test using the vehicle.

Further, recently, an on-vehicle microcomputer for use in an automobile has an increased operational frequency, providing a multicore and multifunctional system. Accordingly, in the virtual verification environment, a microcomputer model for imitating the on-vehicle microcomputer has been more complicated, so that processing load in executing the simulation is increased.

In view of the respects above, in the virtual verification environment based on the cloud computing as disclosed in NPL 1, a plurality of physical computers are arranged. Here, in the plurality of physical computers, the tests are executed in parallel such that a period of time for executing the entire tests is reduced.

However, when trying to execute the simulation based on the cloud computing at speed equivalent to that of the test using the vehicle, a large-scale cloud environment, which includes a large number of physical computers as resources, needs to be prepared. In this case, a tool used for each of the large number of physical computers requires a license, thereby resulting in a larger cost.

These problems are not limited to the development of automobiles described above, but may also arise in development of typical software programs.

An object of the present invention is to provide a technique for accelerating a test of a software program.

Solution to Problem

A verification device according to an aspect of the present invention includes:

a virtual computer configured to imitate a microcomputer equipped with a software program to be verified, in order to verify the software program; and a test execution control computer configured to cause the virtual computer to execute a plurality of test scenarios for verifying the software program.

In the verification device, the test execution control computer is configured:

to divide the plurality of test scenarios into phases, in order to cut out a common part among the plurality of test scenarios as a common phase;

to create and store a tree structure mapping out the plurality of test scenarios as scenario division information, the tree structure where the common phase is followed by a non-common phase, the common phase branched out into the non-common phases;

to cause the virtual computer to execute the common phase in accordance with the tree structure as the scenario division information, and subsequently to store as a snapshot a state of the virtual computer that has executed the common phase, when the test execution control computer causes the virtual computer to execute a first test scenario; and to cause the virtual computer to use the snapshot to reproduce the state of the virtual computer that has executed the common phase, and subsequently to execute the non-common phases, when the test execution control computer causes the virtual computer to execute a second test scenario.

A verification method according to an aspect of the present invention is configured to verify a software program. The verification method is executed by a virtual computer that is configured:

to imitate a microcomputer equipped with the software program to be verified; and to execute a plurality of test scenarios, in order to verify the software program.

In the verification method, a test execution control computer is configured:

to cause the virtual computer to execute the plurality of test scenarios;

to divide the plurality of test scenarios into phases, in order to cut out a common part among the plurality of test scenarios as a common phase;

to create and store a tree structure mapping out the plurality of test scenarios as scenario division information, the tree structure where the common phase is followed by a non-common phase, the common phase branched out into the non-common phases;

to cause the virtual computer to execute the common phase in accordance with the tree structure as scenario division information, and subsequently to store as a snapshot a state of the virtual computer that has executed the common phase, when the test execution control computer causes the virtual computer to execute a first test scenario; and to cause the virtual computer to use the snapshot to reproduce the state of the virtual computer that has executed the common phase, and subsequently to execute the non-common phases, when the test execution control computer causes the virtual computer to execute a second test scenario.

Advantageous Effects of Invention

According to an aspect of the present invention, it is possible to reduce a computing load for an entire part of a test, and thus possible to reduce a period of time for executing the test.

DESCRIPTION OF EMBODIMENTS

An embodiment of the present invention will be described below with reference to the drawings.

Figure 1:
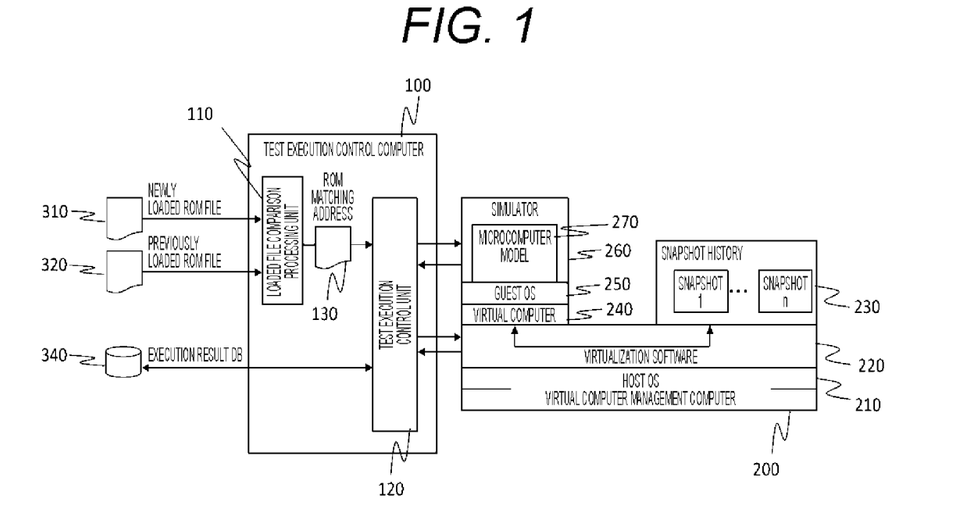
FIG. 1 is a diagram showing an example of a simulation system employing a verification device according to this embodiment.

FIG. 1 is a diagram showing an example of a simulation system employing a verification device according to this embodiment.

As shown in FIG. 1, the simulation system according to this embodiment includes a virtual computer management computer 200 and a test execution control computer 100.

The virtual computer management computer 200 is a physical computer including a virtual computer 240.

The virtual computer 240 includes a guest OS 250, and has a function to execute a simulator 260 under the guest OS 250, the simulator 260 including a microcomputer model 270. With this configuration, the virtual computer 240 imitates a microcomputer equipped with a software program to be tested, so as to verify the software program. Concurrently, the virtual computer management computer 200 includes a host OS 210, and has functions as follows: a function to execute virtualization software 220 under the host OS 210, so as to store, at a specific timing, a state of a virtual computer in a snapshot history 230 as a snapshot, the state of the virtual computer including a state of a central processing unit (CPU) as a processor for the virtual computer 240, a state of a memory of the virtual computer 240, and a state of a storage device for the virtual computer 240; and a function to use information recorded in the snapshot history 230, so as to restore the virtual computer 240 to its specific state. As has been described above, the virtual computer management computer 200 has the function to store the state of the virtual computer in the snapshot history 230 as the snapshot, the state including the state of the CPU for the virtual computer 240, the state of the memory of the virtual computer 240, and the state of the storage device for the virtual computer 240. Then, the virtual computer management computer 200 uses the snapshot to reproduce a state of the microcomputer. Further, as an example, the state of the processor for the virtual computer 240 corresponds to data stored in a register of the processor, and the state of the memory of the virtual computer 240 corresponds to data stored in an entire area of the memory. In this case, the data stored in the register of the processor and the data stored in the entire area of the memory are recorded as the snapshots, so that the state of the microcomputer is reproduced.

The test execution control computer 100 includes a loaded file comparison processing unit 110 and a test execution control unit 120. The loaded file comparison processing unit 110 compares a newly loaded read-only memory (ROM) file 310 with a previously loaded ROM file 320, and outputs an address, where ROM values match, to a ROM matching address 130. The previously loaded ROM file 320 is loaded before a test is executed, and the newly loaded ROM file 310 is loaded when the test has been executed.

Here, when the software program equipped in the microcomputer is corrected, the previously loaded ROM file 320 corresponds to a file loaded by the software program that is not yet corrected. When the software program in the microcomputer is corrected, the newly loaded ROM file 310 corresponds to a file loaded by the software program that has been corrected. Concurrently, when the software program in the microcomputer is corrected, a "state where the test has been executed" corresponds to a state where the test has been executed by the software program corrected. Also, a "state where the test is not yet executed" corresponds to a state where the test is not yet executed by the software program corrected. In other words, in this state, the test has been executed by the software program not yet corrected.

Based on the ROM matching address 130 and an execution result DB 340 where a result of a previous test is recorded, the test execution control unit 120 causes the virtual computer 240 to execute a plurality of test scenarios for verifying the software program, and rewrites the execution result DB 340 in accordance with a result of this simulation. The execution result DB 340 records information including whether the result of the test based on each of the plurality of test scenarios (hereinafter, may be referred to simply as test scenario(s)) is "OK" or "NG", and a ROM address accessed in the test.

Here, when the software program in the microcomputer is corrected, the previous test took place before another test is executed by the software program that has been corrected. In other words, the previous test has been executed by the software program not yet corrected. In the software program corrected, the execution of the test scenario is omitted when the ROM address accessed in the test is not affected (modified) by the correction of the software program and when the result of the previous test is OK.

Figure 2:
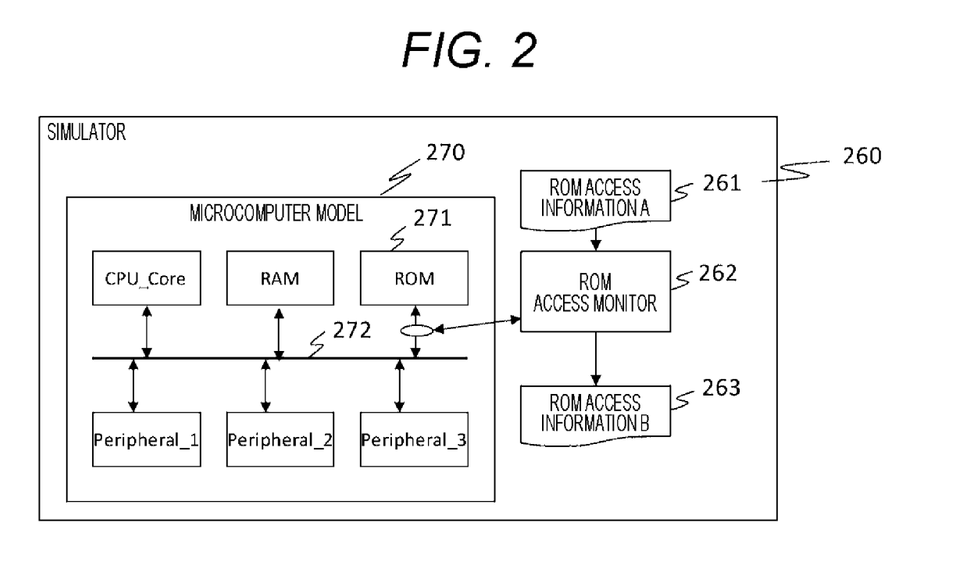
FIG. 2 is a diagram showing a configuration of a simulator in FIG. 1.

FIG. 2 is a diagram showing a configuration of the simulator 260 in FIG. 1.

The simulator 260 in FIG. 2 includes the microcomputer model 270. As shown in FIG. 2, the microcomputer model 270 is equipped with a virtual CPU, a random access memory (RAM), the ROM, and various peripherals, and is configured to load and execute CPU object files that are executable on an actual machine. The various peripherals correspond to various devices used by the CPU. An address of a ROM 271 (accessed address) accessed in the test is recorded by a ROM access monitor 262. When the ROM access monitor 262 has recorded a ROM access information A 261 from the previous test, the ROM access monitor 262 records the address of the ROM 271 (accessed address) accessed in this test in addition to the ROM access information A 261, which is newly recorded as a ROM access information B 263.

The simulation system is configured as has been described above, and carries out a process as will be described below.

First, a process for an entire part of the test in the simulation system of FIG. 1 will be described.

Figure 3:
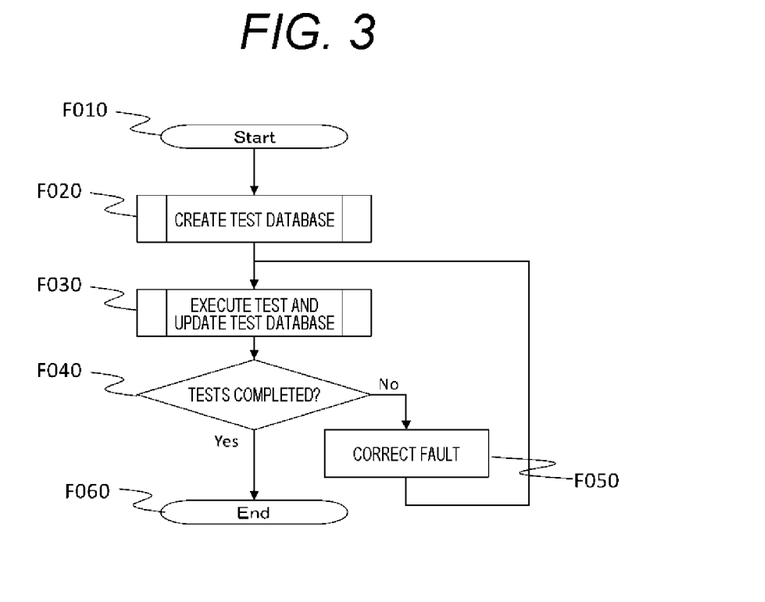
FIG. 3 is a flowchart for describing a process for an entire part of a test in the simulation system shown in FIG. 1.

FIG. 3 is a flowchart for describing the process for the entire part of the test in the simulation system of FIG. 1.

When the test is performed in the simulation system of FIG. 1, at start of the test (F010), an operator performing the test first creates a test database in the execution result DB 340 (F020).

Figure 4:
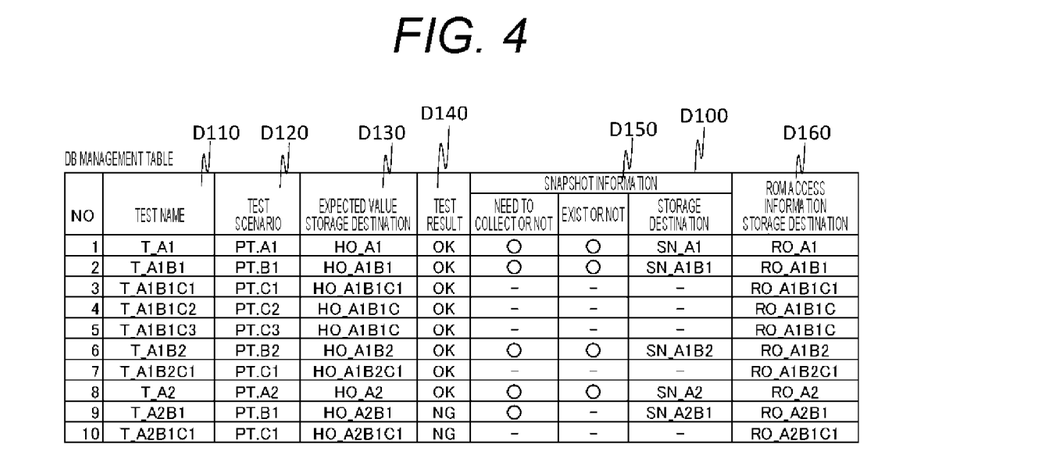
FIG. 4 is a diagram showing a configuration of an execution result DB in FIG. 1.

FIG. 4 is a diagram showing a configuration of the execution result DB 340 in FIG. 1.

In the simulation system of FIG. 1, the execution result DB 340 stores a sequential order for executing the tests, a file required for the simulation of each of the tests, and the result of the corresponding test executed. When the test is to be executed based on the newly loaded ROM file 310, the execution result DB 340 has stored the result of the test based on the previously loaded ROM file 320. When the test has been executed based on the newly loaded ROM file 310, the execution result DB 340 stores the result of the test based on the newly loaded ROM file 310.

The execution result DB 340 of FIG. 1 has an execution result DB management table D100 set as shown in FIG. 4. The execution result DB management table D100 includes a test name D110, a test scenario D120, an expected value storage destination D130, a test result D130, a snapshot information D150, and a ROM access information storage destination D160. The expected value storage destination D130 is a destination where an expected value for each of the test results is stored; the test result D140 describes a comparison between each of the expected values and the corresponding test result; The snapshot information D150 describes the snapshot treated when each of the tests has been executed; and the ROM access information storage destination D160 stores the ROM access information when the test has been executed. The execution result DB management table D100 is created prior to the start of the test. At the start of the test, each item in the table has no data therein.

When the test DB described above has been created, the test is executed (F030). Then, as shown in FIG. 4, the test result is inputted in the test DB such that a test result DB130 is updated (F030).

Subsequently, a determination is made on whether or not all the tests have been completed (F040), and when some tests have not yet been completed, the software program presumably has a fault. In this state, the fault is corrected (F050), and the process returns to F030 to redo the tests. When all the tests have been completed, the tests end here (F060).

Here, in the simulation system of FIG. 1, each of the test scenarios related to the corresponding test is divided such that a tree structure of the test scenarios is created. Then, based on the tree structure of the test scenarios, each of the tests is executed. The tree structure of the test scenarios is created in a method as will be described below.

Figure 5:
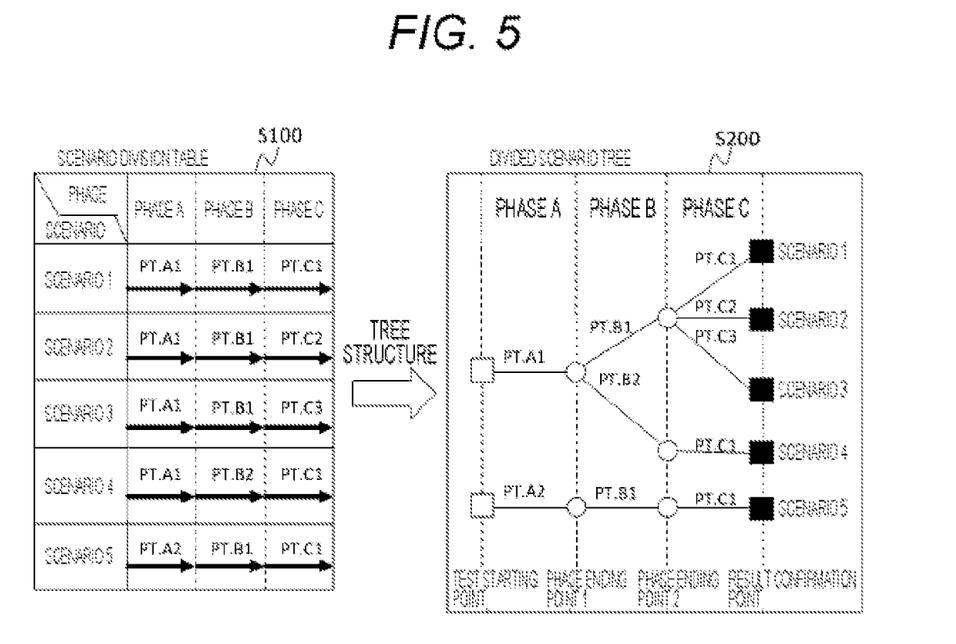
FIG. 5 is a diagram for describing a method to divide each of test scenarios such that a tree structure of the test scenarios is created, the test scenarios to be used in the simulation system of FIG. 1.

FIG. 5 is a diagram for describing a method to divide each of the test scenarios such that the tree structure of the test scenarios is created, the test scenarios to be executed in the simulation system of FIG. 1.

As shown in FIG. 5, the test execution control unit 120 divides the plurality of test scenarios (to be executed in verification in the simulation system of FIG. 1), i.e., a scenario 1, a scenario 2, a scenario 3, a scenario 4, and a scenario 5, into a plurality of phases, i.e., a phase A, a phase B, and a phase C, so as to create a scenario division table S100. While each of the scenarios 1 to 5 is originally a single scenario, in the scenario division table S100, each common part among the scenarios 1 to 5 is cut out as a phase.

Subsequently, as shown in FIG. 5, the test execution control unit 120 creates a divided scenario tree S200 as scenario division information where the scenarios 1 to 5 are divided and mapped out. The divided scenario tree S200 shows a common phase followed by a non-common phase, the common phase branched out into the non-common phases. The test execution control unit 120 determines the sequential order for executing the tests based on the tree structure.

For example, in the scenario division table S100 of FIG. 5, each of the scenarios 1 to 3 is divided into three phases, i.e., the phase A, the phase B, and the phase C. In the scenario division table S100, each of the scenarios 1 to 3 is shown with an arrow in each of the phases A, B, and C. Each of the phase A and the phase B is common among the scenarios 1 to 3, and the phase C varies among the scenarios 1 to 3. In accordance with this configuration, the test execution control unit 120 creates the tree structure, based on which the sequential order for executing the test scenarios is determined. In the sequential order of this example, first, a PT. A1 as the phase A and a PT. B1 as the P phase B are each tested only once. Then, in the scenario 1, a PT. C1 as the phase C is tested. In the scenario 2, the PT. A1 as the phase A and the PT. B1 as the phase B are omitted, and a PT. C2 as the phase C is tested. In the scenario 3, the PT. A1 as the phase A and the PT. B1 as the phase B are omitted, and a PT. C3 as the phase C is tested.

In this state, in each of the phases of the test scenarios, the test execution control unit 120 checks the expected value at end of the test. "Checking the expected value" corresponds to a process for comparing the value outputted as the result of the test executed in each of the phases with the expected value presumed for the test of the corresponding phase. Based on the process, determination is made on whether the test is OK or NG. Subsequently, when each of the phases is followed by another phase, the state of the virtual computer 240 is stored in the snapshot history 230 as the snapshot of the corresponding phase. Then, when the virtual computer 240 executes each of the test scenarios (that are different from one another), based on the snapshot of the corresponding phase stored in the snapshot history 230, the virtual computer 240 reproduces the state where the common phases have been tested, and only tests the non-common phases. Note that, as a method to determine the sequential order for executing the test scenarios, the test execution control unit 120 regards the divided scenario tree S200 as a tree structure where the sequential order is scheduled in a depth-first order.

As has been described above, in the plurality of test scenarios, the common phase is not tested repeatedly. Instead, in the plurality of test scenarios, the virtual computer is caused to use the snapshot to reproduce the state of the virtual computer where the common phase has been tested. Accordingly, the common phase is omitted, and the test of the software program is thus accelerated.

Next, a process performed in the test execution control unit 120 of FIG. 1 will be specifically described.

Figure 6:
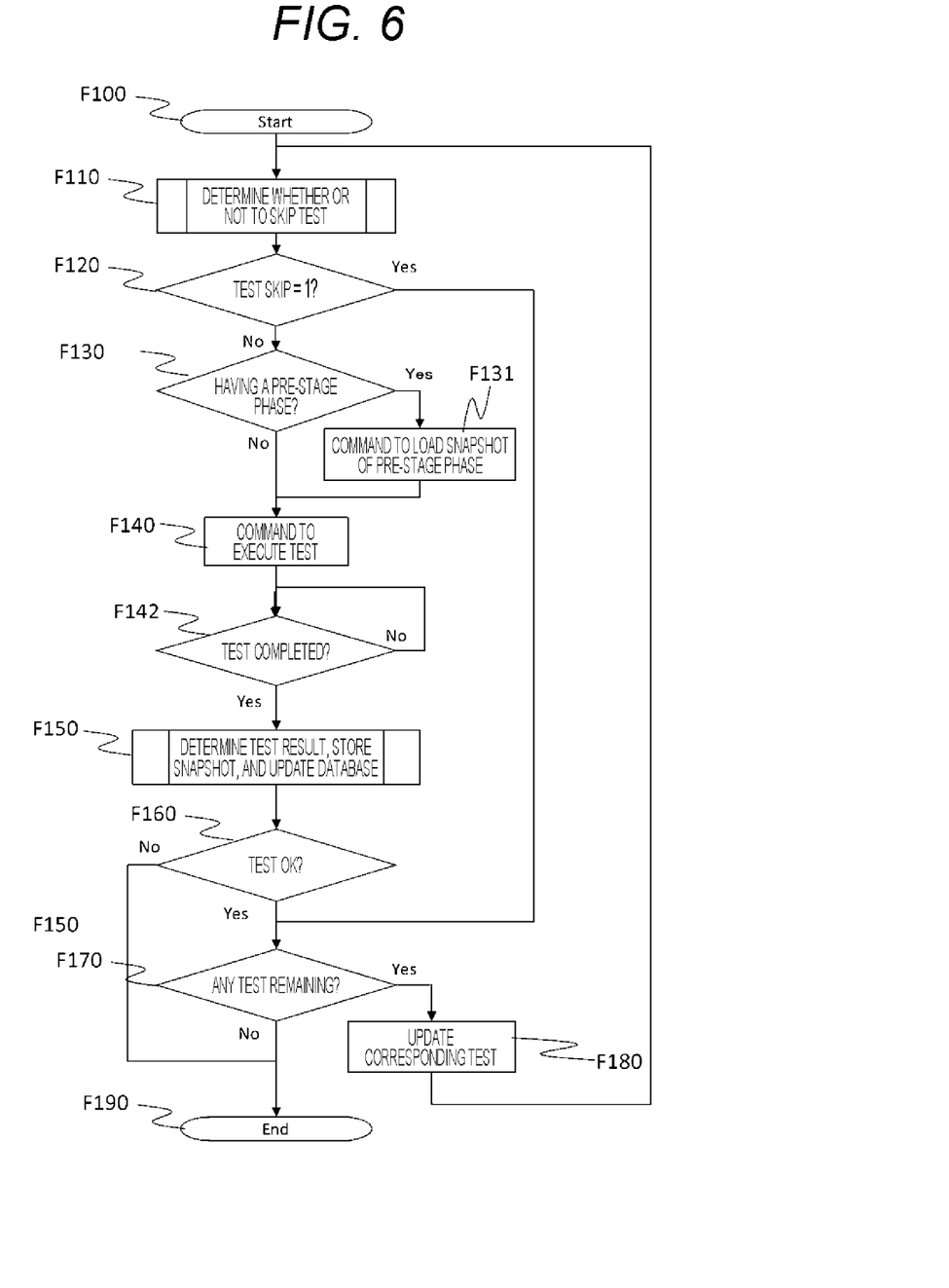
FIG. 6 is a flowchart for describing a specific process performed in a test execution control unit in FIG. 1.

FIG. 6 is a flowchart for describing the process performed in the test execution control unit 120 of FIG. 1.

At start of the process (F100), the test execution control unit 120 first determines whether or not to skip (omit) the test (F110).

Figure 7:
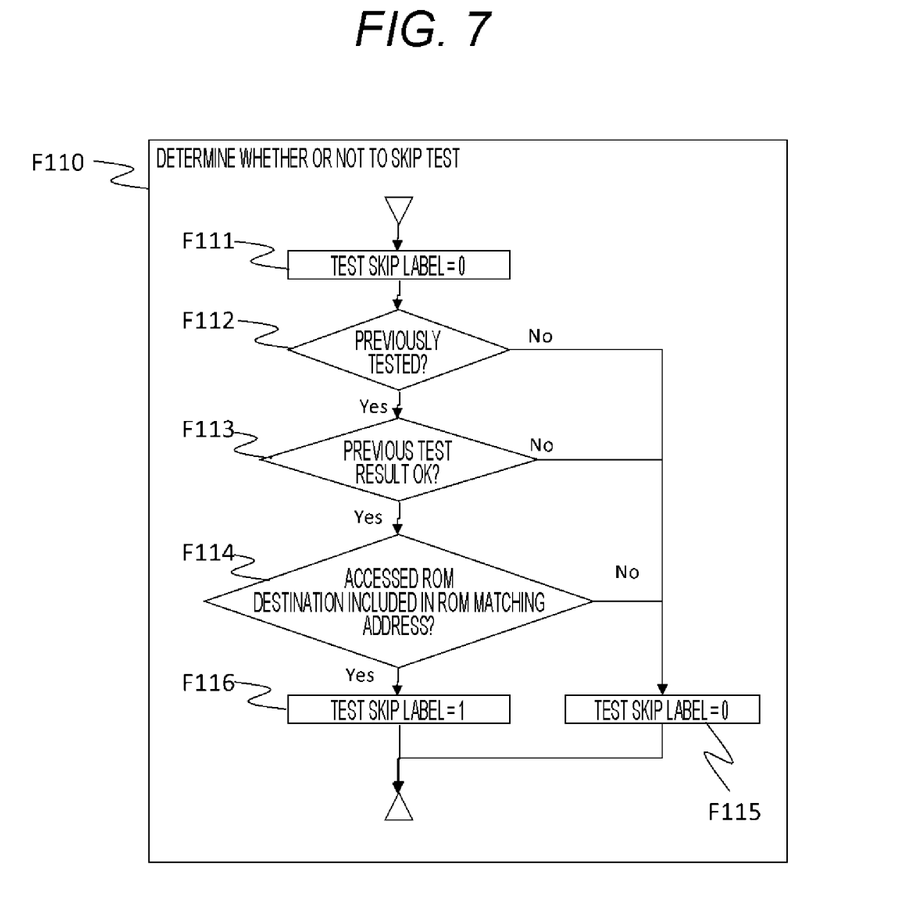
FIG. 7 is a flowchart for describing a detailed process for determining to skip the test in FIG. 6.

FIG. 7 is a flowchart for describing a detailed process for determining whether or not to skip the test in the process of FIG. 6.

In order to determine whether or not to skip the test, the test execution control unit 120 first clears a test skip label to 0 (F111).

Next, for example, when verifying a software program modified, the test execution control unit 120 checks whether or not the software program has been previously tested (F112). When the software program has been previously tested, the test execution control unit 120 sees the previously loaded ROM file 320 to determine whether the result of the previous test is good or not (F113). Here, in the test execution control computer 100, the loaded file comparison processing unit 110 sees the newly loaded ROM file 310 as well as the previously loaded ROM file 320, so as to extract an accessed address where the values match between the software program modified and the software program not yet modified. The loaded file comparison processing unit 110 records the accessed address extracted into a file of the ROM matching address 130 as "unmodified address information".

When the result of the previous test is good, the test execution control unit 120 sees the ROM matching address 130 to determine whether or not an accessed address, i.e., an address accessed from the beginning until the common phase in the scenario being tested, is included in the unmodified address information (F114).

The test execution control unit 120 leaves the test skip label at zero in any one of the following cases: a case where the software program has not been previously tested; a case where the result of the previous test is not good; or a case where the accessed address (the address accessed from the beginning until the common phase in the scenario being tested) is not included in the unmodified address information (F115). As a result, the corresponding test is not skipped but executed.

On the other hand, in F114, when the accessed address (the address accessed from the beginning until the common phase in the scenario being tested) is included in the unmodified address information, the test execution control unit 120 changes the test skip label to 1 (F116). As a result, the corresponding test is skipped.

Returning to FIG. 6, when the test skip label is not 1 (F120), the test execution control unit 120 determines whether or not the phase has a pre-stage phase (F130). When the phase has the pre-stage phase, the test execution control unit 120 outputs a command to load a snapshot of the pre-stage phase from the snapshot history 230 (F131). With this configuration, based on the snapshot loaded, the state of the virtual computer 240, where the common phase has been tested, is reproduced.

When having confirmed that the phase does not have the pre-stage phase in F130, or when having outputted the command to load the snapshot of the pre-stage phase in F131, the test execution control unit 120 outputs a command to execute the test (F140) and waits until the test is completed (F142). When the test has been completed, the test execution control unit 120 determines the result of the test, stores the snapshot of the virtual computer 240 in the snapshot history 230, and updates the test result DB 130 (F150).

Figure 8:
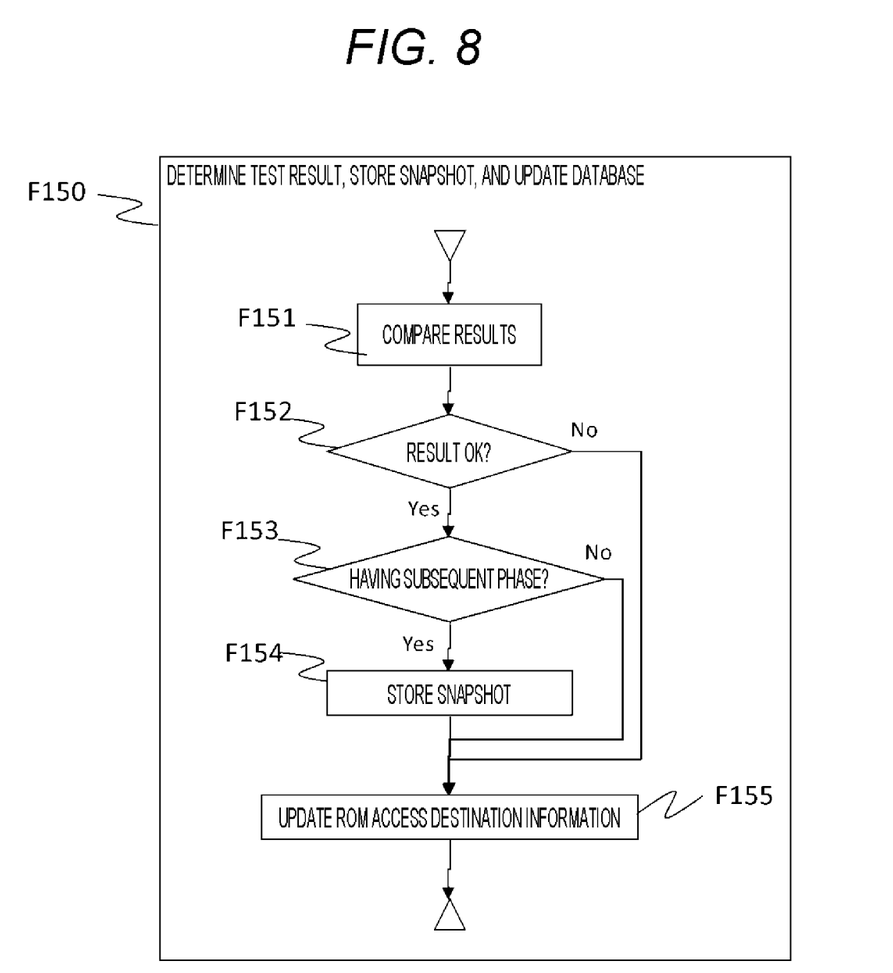
FIG. 8 is a flowchart for describing a process for determining a result of the test (described in FIG. 6) and storing a snapshot of the result of the test (described in FIG. 6).

FIG. 8 is a flowchart for describing a process for determining the result of the test, storing the snapshot, and updating the DB, each shown in FIG. 6.

In determining the result of the test (F151), when the result of the test in each of the phases of the test scenario is good (F152), the test execution control unit 120 sees the divided scenario tree S200 of FIG. 3 to determine whether or not the corresponding phase has a subsequent phase (F153). When the corresponding phase has the subsequent phase, the test execution control unit 120 stores the state of the virtual computer 240, where the corresponding phase has been tested, in the snapshot history 230 (F154). The test execution control unit 120 further stores the accessed address that the virtual computer 240 accessed from the beginning until the corresponding phase in the test scenario, together with the result of the test (F140) confirmed OK, into the execution result DB 340, so that the execution result DB 340 is updated (F155). Then, when the software program is modified, the accessed address stored is to be used to generate the unmodified address information. When the result of the test is not good (F152), or when the corresponding phase has no subsequent phase (F153), the test execution control unit 120 does not store the state of the virtual computer 240 as the snapshot in the snapshot history 230; instead, the test execution control unit 120 stores the result of the test (F140) confirmed NG into the execution result DB 340 such that the execution result DB 340 is updated (F155).

Returning to FIG. 6, subsequently, the test execution control unit 120 determines whether or not all the tests have been completed (F160 and F170). When some tests have not yet been completed, the test execution control unit 120 updates the corresponding tests (F180) and returns to F110 to continue the tests until the process ends (F190).

As has been described above, when the software program has been modified, and when the result of the test before the modification of the software program is good as well as the accessed addresses match in value between before and after the modification, in a second test scenario, the execution of the test in the phase that is in common with a phase of a first test scenario is omitted. With this configuration, it is possible to execute a test again on a section that has been affected (modified) by the modification of the software program, and possible to omit the test on a section that has not been affected (modified) by the modification of the software program.

Additionally, when the result of the test in each of the phases of the test scenario is good, and when the corresponding phase has the subsequent phase, the state of the virtual computer, where the corresponding phase has been tested, is stored as the snapshot; and concurrently, the accessed address, which the virtual computer accessed from the beginning until the corresponding phase in the test scenario, is stored. With this configuration, when the software program has been modified, it is possible to easily generate the unmodified address information based on the accessed address stored.

In the simulation system of FIG. 1, a communication operation between the test execution control unit 120, the simulator 260, and the virtualization software 220 is carried out as will be described below.

Figure 9:
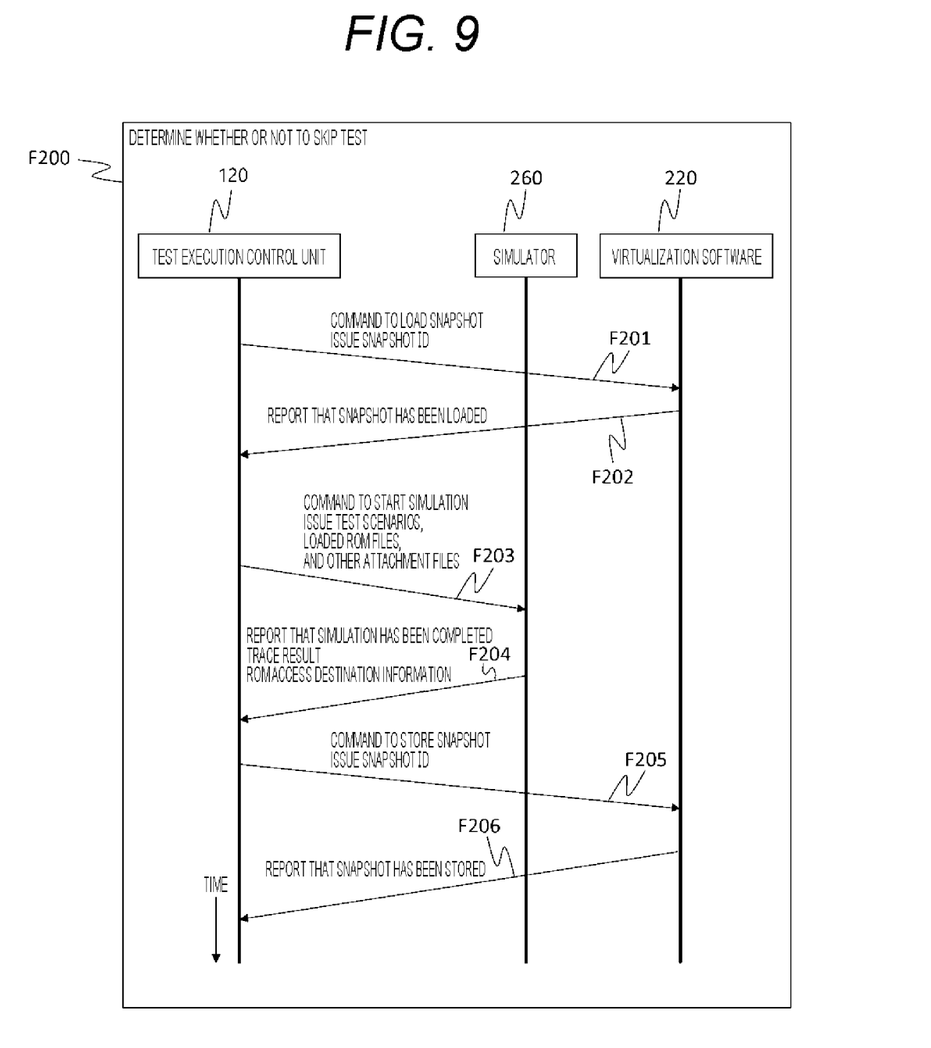
FIG. 9 is a sequence diagram for describing a communication operation between the test execution control unit, the simulator, and virtualization software, each shown in the simulation system of FIG. 1, the communication operation being carried out when one phase is executed.

FIG. 9 is a sequence diagram for describing the communication operation between the test execution control unit 120, the simulator 260, and the virtualization software 220 in the simulation system of FIG. 1, the communication operation being carried out when a test in each of the phases is executed.

In executing the test described above, when each of the phases does not correspond to a first phase of the test scenario, the test execution control unit 120 outputs the command to the virtualization software 220 to load the snapshot (of the pre-stage phase), and issues a snapshot ID to identify the snapshot to be loaded (F201).

In response to the command, the virtualization software 220 loads the snapshot identified based on the snapshot ID from the snapshot history 230. When the snapshot has been loaded, the virtualization software 220 reports to the test execution control unit 120 that the snapshot has been loaded (F202). Note that, when the corresponding phase corresponds to the first phase of the test scenario, the communication operation in each of F201 and F202 is not carried out.

Next, the test execution control unit 120 outputs the command to the simulator 260 to start the simulation, and issues the test scenarios, the loaded ROM files, and other attachment files required for the simulation, e.g., sensor input information or trace information (F203).

Based on the information issued by the test execution control unit 120, the simulator 260 executes the simulation. When the simulation has been completed, the simulator 260 reports to the test execution control unit 120 that the simulation has been completed, together with the result of the test (as the result of the simulation) and the ROM access information (F204).

The test execution control unit 120 determines the result of the test reported from the simulator 260. When the result of the test shows an operation as expected, the test execution control unit 120 outputs the command to the virtualization software 220 to store the snapshot and issues the snapshot ID to identify the snapshot (F205).

In accordance with the command from the test execution control unit 120, the virtualization software 220 stores the result of the test as the snapshot in the snapshot history 230. When the snapshot has been stored, the virtualization software 220 reports to the test execution control unit 120 that the snapshot has been stored (F206).

In the simulation system shown in FIG. 1, the test execution control computer 100 and the virtual computer management computer 200 are coordinated with each other as has been described above. With this configuration, it is possible to utilize each of halfway results of the simulation, to reduce a load exerted on the computer system, and to reduce a period of time for executing the simulation.

Note that, in this embodiment, the test execution control computer 100 and the virtual computer management computer 200 are separate computers, but when resources of the computers need to be reduced, the processes performed in the test execution control computer 100 may be performed under the host OS of the virtual computer management computer 200.

Further, the simulation system, which has been described above, may be applied to verify various functions in an on-vehicle electronic control device for use in an automobile. In this case, the virtual computer 240 is configured to execute both a model that imitates the on-vehicle electronic control device and a simulator that imitates the automobile for the on-vehicle electronic control device. In the verification here, the test scenario is presumably configured to verify "fault handling" or configured to verify "each function at normal times".

When a fault occurs in a test, the fault in the software program is corrected, and the test is to be executed again in an operation as will be described below.

In accordance with the flow of the test (flow of the process) in FIG. 3, when the test database has been created (F020), the test execution control unit 120 executes the test based on the execution result DB management table in F030 (i.e., executing the test and updating the test database). In this state, for example, when the result of test NO. 9 is NG as shown in FIG. 4, the test execution control unit 120 follows the flow of the process and updates the test DB without executing a subsequent test. Subsequently, the fault is corrected in F050 (i.e., correcting the fault) in the flow of FIG. 3, and the test is to be executed again.

When the test is executed again, the loaded file comparison processing unit 110 sees the previously loaded ROM file 320 (before the fault is corrected) and the newly loaded ROM file 310 (after the fault is corrected), so as to extract the accessed address where the ROM values match between these two loaded ROM files. Subsequently, the process continues in accordance with the flow of the process performed in the test execution control unit 120.

In executing each of the tests, the determination described in F114 of FIG. 7 is made. When the accessed address in the newly loaded ROM file 310 is included in the ROM matching address 130, the ROM value in the accessed address in the newly loaded ROM file 310 matches the ROM value in the accessed address in the previously loaded ROM file 320. Thus, the processes for the software program are the same as each other. In this case, the result of the corresponding test is to be the same as the previous test, and thus, the corresponding test is to be skipped.

Here, the result of the test NO. 9 in FIG. 4 is NG and the fault is corrected. Due to the correction of the fault, the ROM is to be modified, and the modification of the ROM is assumed to affect a test of a PT. B2 in the phase B. In this case, the modification of the ROM also affects the phases subsequent to the PT.B2. Thus, in FIG. 4, NO. 6, 7, 9, and 10 are to be tested again. With regard to NO. 1, 2, 3, 4, 5 and 8, when the ROM address and the ROM value in the ROM address are the same as previous, the tests are to be skipped. As a result, the tests to be executed are narrowed down, and an entire period of time for executing the tests is reduced.

It should be noted that the foregoing embodiment is merely illustrative; and thus, the present invention is not limited to the foregoing embodiment. Any change, addition, or modification appropriately made by those skilled in the art within the spirit of the present invention will naturally fall within the scope of claims of the present invention.

REFERENCE SIGNS LIST 100 test execution control computer
110 loaded file comparison processing unit
120 test execution control unit
130 ROM matching address
200 virtual computer management computer
210 host OS
220 virtualization software
230 snapshot history
240 virtual computer
250 guest OS
260 simulator
261, 263 ROM access information
262 ROM access monitor
270 microcomputer model
271 ROM model
272 bus
310, 320 loaded ROM file
340 execution result DB

The invention claimed is:

1. A verification device comprising:
   a physical computer configured to imitate a microcomputer equipped with a software program to be verified, in order for the physical computer to verify the software program; and
   a test execution control computer configured to cause the physical computer to execute a plurality of test scenarios for verifying the software program,
   wherein
   the test execution control computer is configured:
   to divide the plurality of test scenarios into phases, in order to cut out a common part among the plurality of test scenarios as a common phase;
   to create and store a tree structure mapping out the plurality of test scenarios as scenario division information, the tree structure where the common phase is followed by a non-common phase, the common phase branched out into the non-common phases;
   to cause the physical computer to execute the common phase in accordance with the tree structure as the scenario division information, and subsequently to store as a snapshot a state of the physical computer that has executed the common phase, when the test execution control computer causes the physical computer to execute a first test scenario; and
   to cause the physical computer to use the snapshot to reproduce the state of the physical computer that has executed the common phase, and subsequently to execute the non-common phases, when the test execution control computer causes the physical computer to execute a second test scenario, wherein
   when verifying a software program that has been modified, the test execution control computer extracts an accessed address where values match between the software program that has been modified and a software program that has not yet been modified, and records the accessed address as unmodified address information, and
   when in the second test scenario, a result of a test for verifying the software program that has not yet been modified is an expected value in the common phase, and when an accessed address from a beginning to the common phase in the second scenario is included in the unmodified address information, the test execution control computer causes the physical computer to use the snapshot to reproduce the state of the physical computer that has executed the common phase.

2. The verification device according to claim 1, wherein when the result of the test in each of the phases of the test scenario is the expected value, and when a corresponding one of the phases has a subsequent phase in the tree structure as the scenario division information, the test execution control computer stores as a snapshot a state of the physical computer that has executed the corresponding one of the phases, and stores an accessed address accessed by the physical computer from the beginning to the corresponding one of the phases in the test scenario, and
when the software program is modified, the test execution control computer uses the accessed address to generate the unmodified address information.

3. The verification device according to claim 1, wherein the test execution control computer causes the physical computer to store, as the snapshot, a state of a processor for the physical computer and a state of a memory of the physical computer.

4. The verification device according to claim 3, wherein the state of the processor for the physical computer corresponds to data stored in a register of the processor, and
the state of the memory of the physical computer corresponds to data stored in an entire area of the memory.

5. The verification device according to claim 1, wherein the microcomputer corresponds to an on-vehicle electronic control device to be mounted on an automobile, and
the physical computer executes a model that imitates the microcomputer, and a simulator that imitates the automobile with respect to the microcomputer.

6. A verification method of verifying a software program, the method comprising:
   imitating, by a physical computer, a microcomputer equipped with the software program to be verified; and
   executing by the physical computer imitating the microcomputer, a plurality of test scenarios, in order to verify the software program,
   causing, by a test execution control computer, the physical computer imitating the microcomputer, to execute the plurality of test scenarios;
   dividing by the test execution control computer, the plurality of test scenarios into phases, in order to cut out a common part among the plurality of test scenarios as a common phase;
   creating and storing by the test execution control computer, a tree structure mapping out the plurality of test scenarios as scenario division information, the tree structure where the common phase is followed by a non-common phase, the common phase branched out into the non-common phases;

causing, by the test execution control computer, the physical computer imitating the microcomputer to execute the common phase in accordance with the tree structure as the scenario division information, and subsequently to store as a snapshot a state of the physical computer imitating the microcomputer that has executed the common phase, wherein the test execution control computer causes the physical computer imitating the microcomputer to execute a first test scenario; and causing, by the test execution control computer, the physical computer imitating the microcomputer, to use the snapshot to reproduce the state of the physical computer that has executed the common phase, and subsequently executing the non-common phases, wherein the test execution control computer causes the physical computer imitating the microcomputer to execute a second test scenario, verifying a software program that has been modified, wherein the test execution control computer extracts an accessed address where values match between the software program that has been modified and a software program that has not yet been modified, and records the accessed address as unmodified address information, and in the second test scenario, in response to a result of a test for verifying the software program that has not yet been modified being an expected value in the common phase, and an accessed address from a beginning to the common phase in the second scenario being included in the unmodified address information, the test execution control computer causes the physical computer imitating the microcomputer to use the snapshot to reproduce the state of the physical computer imitating the microcomputer that has executed the common phase.

* * * * *